Oct. 13, 1953

H. W. HEMPEL 2,655,372

MACHINE FOR MECHANICALLY ELECTRICALLY
MEASURING AND DISPENSING GUMMED TAPE

Filed Oct. 17, 1949

INVENTOR:
HERBERT W. HEMPEL,
BY Rogers & Ezell,
ATTORNEYS.

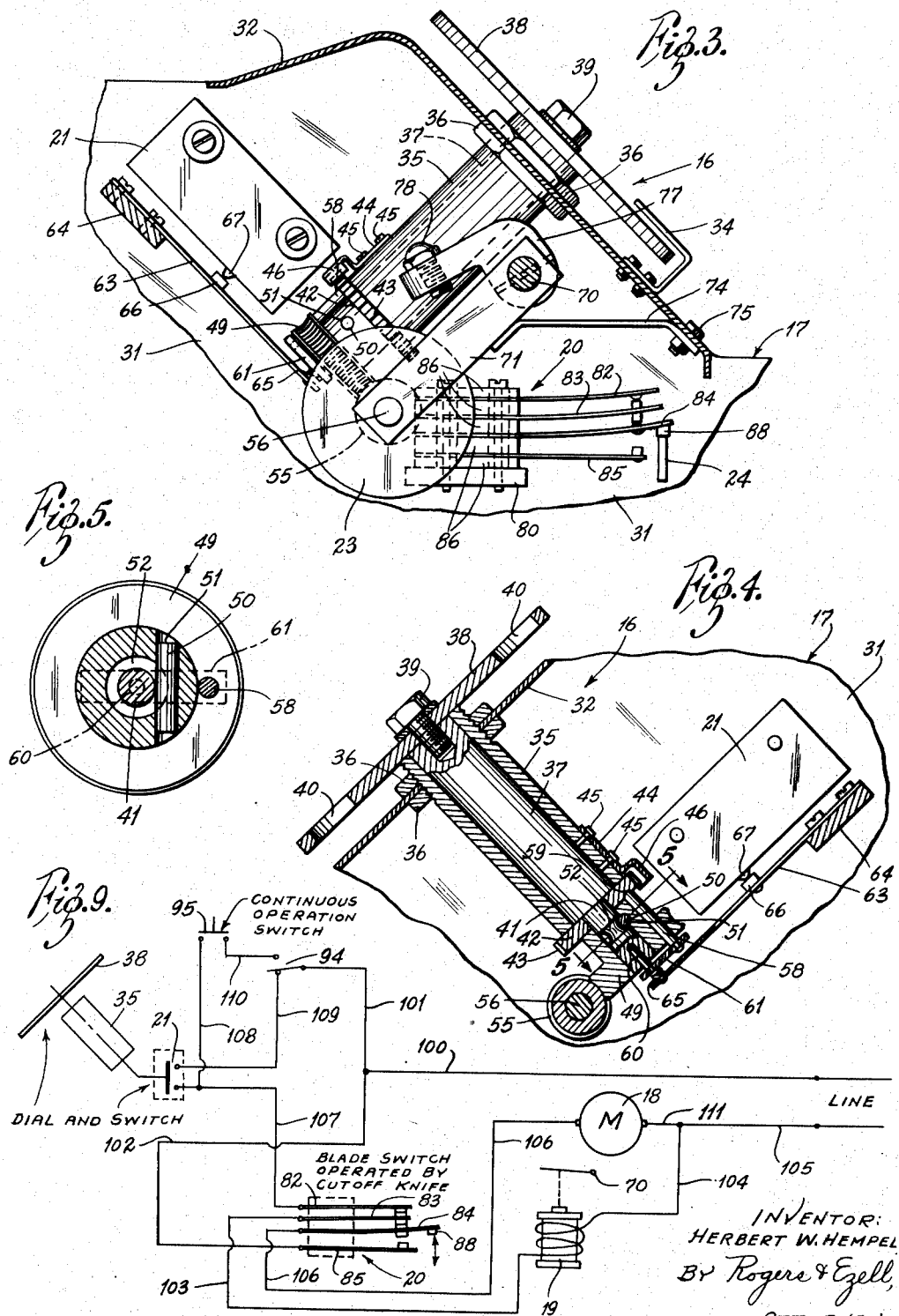

Patented Oct. 13, 1953

2,655,372

UNITED STATES PATENT OFFICE 2,655,372

MACHINE FOR MECHANICALLY ELECTRICALLY MEASURING AND DISPENSING GUMMED TAPE

Herbert W. Hempel, Belleville, Ill., assignor to Marsh Stencil Machine Company, Belleville, Ill., a corporation of Illinois Application October 17, 1949, Serial No. 121,879

15 Claims. (Cl. 271—2.4)

The present invention relates generally to dispensing machines, and more particularly to a machine for mechanically electrically measuring and dispensing gummed tape.

In brief, the present invention is a tape dispensing machine which includes novel manually actuatable mechanism for mechanically indicating or selecting the length of an increment of tape to be measured and dispensed, electrical apparatus for, in timed relation, energizing an electric motor and solenoid for respectively rotating a feed wheel and bringing a tape pressure and measuring wheel into operative contact with a tape strip to press the same against the feed wheel, mechanical mechanism determining the length of tape increment fed by said wheels for subsequently deenergizing the motor and the solenoid, and mechanism operating a movable cutting knife to sever the measured and dispensed tape, including mechanism for reenergizing the motor during the tape severing stroke of the movable cutting knife.

The disclosures of the applicant's copending application, Serial No. 115,238, filed September 12, 1949, are incorporated herein by reference insofar as said disclosures are applicable.

Therefore, an object of the present invention is to provide a novel simplified tape measuring and dispensing machine in which the selected increment of tape to be dispensed is mechanically indicated and in which the immediate measuring and dispensing actions are mechanically-electrically controlled and power effected.

Another object is to provide a novel mechanical electrical control for tape dispensing machines to effect rapid and accurate power actuated measuring and dispensing of selected tape increments.

Another object is to provide a novel electric tape measuring and dispensing machine which is of simplified construction both in the tape increment selector mechanism and in the measuring and dispensing mechanism.

Another object is to provide a novel electric tape measuring and dispensing machine which may be operated optionally through a dial selector tape increment mechanism or continuously with random selection of tape lengths.

The foregoing and other objects and advantages are apparent from the following description taken with the accompanying drawings, in which:

Fig. 3 is an enlarged fragmentary vertical central cross-sectional view of the mechanical selector mechanism and related electrical elements;

Fig. 4 is an enlarged fragmentary vertical cross-sectional view through the selector mechanism;

Fig. 5 is a further enlarged cross-sectional view on substantially the line 5—5 of Fig. 4;

Fig. 9 is a wiring diagram disclosing the several electrical connections.

Figure 1:
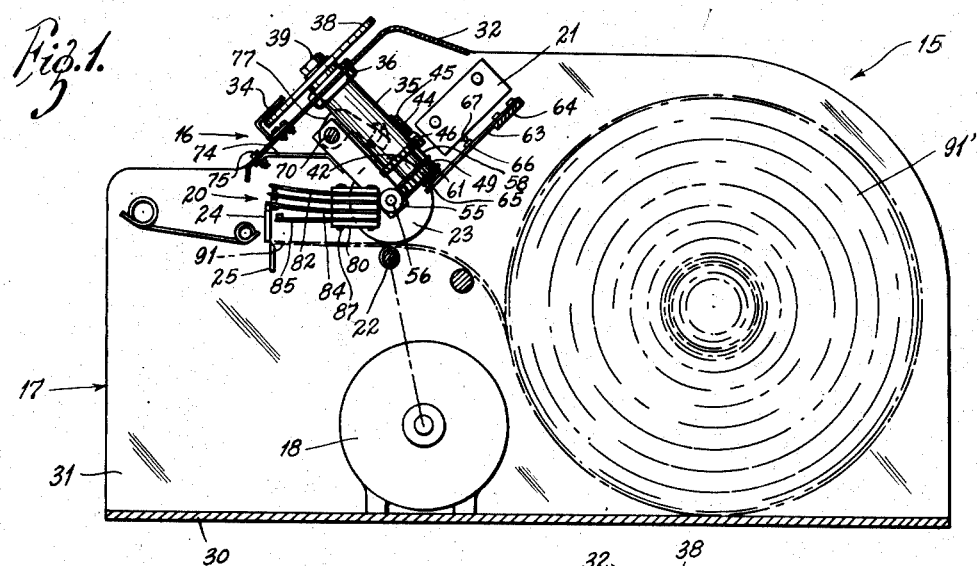
Fig. 1 is a central vertical cross-sectional view through a tape measuring and dispensing machine incorporating the teachings of the present invention.
Figure 2:
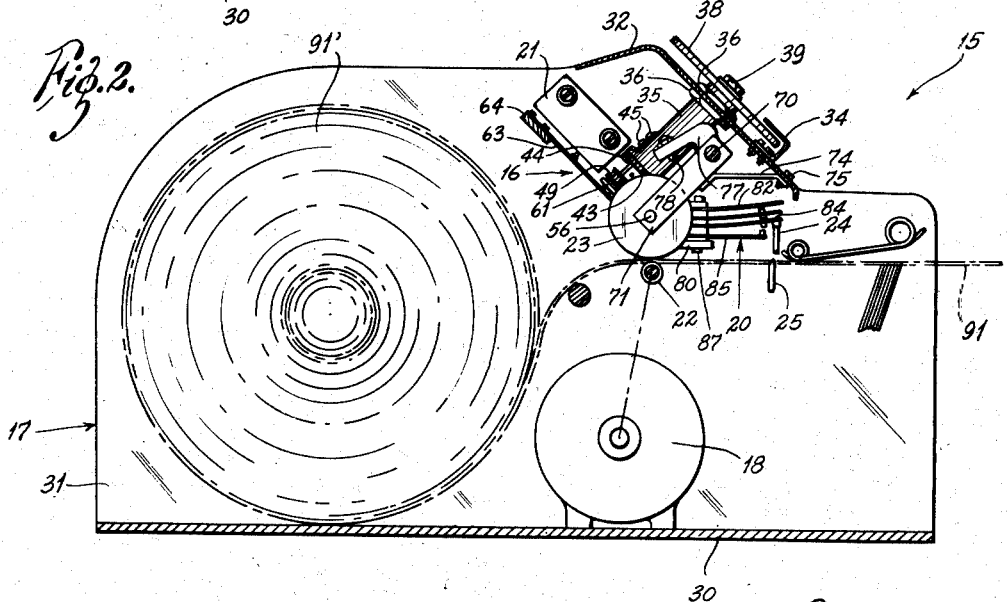
Fig. 2 is a view similar to Fig. 1, but considering the elements from the opposite side.
Figure 7:
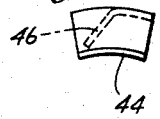
Fig. 7 is an end view thereof.
Figure 6:
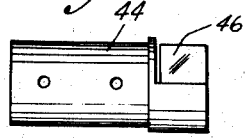
Fig. 6 is a plan view of the ratchet stop.
Figure 8:
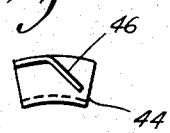
Fig. 8 is an end view thereof from the other direction.

Referring to the drawings more particularly by reference numerals, 15 indicates generally a tape measuring and dispensing machine incorporating the concepts of the present invention. Broadly, the present machine 15 includes manually actuatable mechanical tape increment selector mechanism 16 mounted on a casing 17, a motor 18, a solenoid 19, a multiple blade switch 20, a microswitch 21, a tape feed wheel 22, a tape pressure and measuring wheel 23 and related elements for measuring tape increments, a movable knife blade 24 and a fixed blade 25, and interrelating and interengaging elements and leads, including a water reservoir and brush, and other usual parts.

The casing 17 is of U-cross section and includes a base 30, spaced parallel side walls 31 and a transverse angularly disposed plate portion 32 which may be formed integral with or be secured to the side walls 31.

The manually actuatable tape increment selector mechanism 16 is mounted on the plate 32, as is clearly shown in the drawings, particularly Fig. 4. The mechanism 16 includes a sleeve 35 having threads at its upper end. The threaded portion of the sleeve 35 extends through an opening in the plate 32 and is maintained in this position by suitable lock nuts 36 which threadedly engage the upper end of the sleeve 35 and are disposed on opposite sides of the plate 32 in clamping engagement therewith. A shaft 37 is rotatably mounted in the sleeve 35. A selector dial 38 is secured to the upper end of the shaft 37 by a screw 39 for movement of the shaft 37 when the selector dial 38 is rotated. The selector dial 38 includes finger openings 40 through which a selected series of fixed numbers on the plate 32 are visible, and it abuts the upper end of the sleeve 35 to serve as a stop limit for the shaft 37. An index stop 34 is mounted on the plate 32 and overlies the dial 38 (Fig. 3). The shaft 37 includes a reduced lower portion 41 which is free of the sleeve 35 and which has a collar 42 secured thereto for rotation therewith. The collar 42 has index teeth 43 equal in number to the number of openings 40 in the selector dial 38. A pawl 44 is secured to the lower end of the sleeve 35 by suitable screws 45, and includes a lip 46 which engages an index tooth 43 to maintain the selector dial 38 and the collar 42 in any selected position relative to the sleeve 35 and to the other working elements more particularly described below.

A worm wheel 49 is freely mounted on the reduced extension 41 of the shaft 37 by means of a suitable pin 50 disposed in an opening 51 extending through the worm wheel 49 and located in an annular groove 52 formed in the reduced extension 41 (Fig. 5). The worm wheel 49 is in engagement with a worm gear 55 which is secured to a tape pressure and measuring wheel shaft 56 suitably mounted for rotation and support as described below.

A pin 58 extends through a suitable axial opening in the worm wheel 49 and contacts the lower surface of the collar 42, being adapted to extend into a depression 59 in the surface of the collar 42 in one position of the latter. A second pin 60 extends into a suitable opening or well in the end of the reduced portion 41 in parallel relation to the pin 58, the lower ends of each of the pins 58 and 60 being anchored to a small plate 61. A leaf spring 63 secured to a suitable support bar 64, extending between the walls 31, normally maintains the pins 58 and 60 in the positions shown in Fig. 4 through the engagement of a bumper 65 secured to the free end of the leaf spring 63 with the head of the pin 60. A second bumper 66 is secured to the leaf spring 63 intermediate its ends which engages a spring-biased or otherwise actuated trigger 67 forming part of the micro-switch 21 which is suitably mounted adjacent the leaf spring 63, as shown in Fig. 4, by a bracket or the like extending from a wall 31. The micro-switch 21 is of any standard construction and is in open position when the trigger 67 is depressed by the bumper 66, as is shown in Fig. 4, and is in closed position when the pin 58 is forced from the depression 59 through rotation of the selector dial 38, which manifestly forces the leaf spring 63 downwardly, thereby moving the bumper 66 a predetermined amount away from the trigger 67 so that the contacts of the micro-switch may be spring or otherwise closed.

A pivot shaft 70 is provided which is rotatably supported in suitable bearings mounted on the walls 31 (not shown) which is actuated by the solenoid 19 indicated in Fig. 9 in the same manner that the pivot shaft 65 is actuated in the applicant's copending application, Serial No. 115,238, filed September 12, 1949. A yoke 71 is freely mounted on the pivot shaft 70 and rotatably supports between the radially extending legs thereof the tape pressure and measuring wheel 23 on the shaft 56, being secured to the shaft 56 for rotation therewith, as is the above-mentioned worm gear 55. A leaf spring 74 secured to the plate 32 by a suitable nut and bolt assembly 75 engages the underside of the yoke 71 and biases it clockwise about the pivot shaft 70, urging the worm gear 55 into snug relationship with worm wheel 49. A pressure link 77 is secured to the pivot shaft 70 for movement therewith and includes an adjustable screw 78 near its free end which engages the upper side of the yoke 71 upon rotation of the shaft on energization of the solenoid 19 to force the pressure wheel 23 in feeding engagement with tape fed through and across the feed wheel 22 which is mechanically connected to the motor 18 through reduction gearing, as is applicant's just mentioned copending application. In this operation, the biasing effect of the spring 74 is overcome, and the worm gear 55 is separated from snug contact to pitch line contact with the worm wheel 49, but not operatively disengaged.

The multiple blade switch 20 is mounted on a suitable cross member 80 supported by a wall 31, and includes three conductive spring leaf blades 82, 83 and 84 in one operative group and a single similar blade 85 which cooperates with the conductive blade 84 in the latter's lower position of movement. Insulative laminations 86 and screws 87 mount the blades 82 through 85 on the member 80. Each of the blades 82 and 85 has a single contact near the free end thereof, while the blades 83 and 84 include upper and lower contacts. The blade 84, at its extreme free end, has an insulative bumper 88 secured thereto.

The movable knife blade 24 engages the bumper 88 when the former is in its raised or inoperative position, thereby biasing the several contacts of the blades 82, 83 and 84 into engagement, as is clearly shown in Fig. 3. The movable knife blade 24 is disposed above a tape strip 91, and may be a pivoted blade like that shown in applicant's copending application, Serial No. 115,238, filed September 12, 1949. The movable knife blade 24 cooperates with the fixed knife blade 25 disposed below the tape 91 for severing the tape. It is to be understood that the movable knife blade 24 is actuated by the motor 18 through suitable mechanism such as that shown in the just mentioned pending application of the applicant. As the movable knife blade 24 moves downwardly in its cutting stroke, the contact of the blade 82, the contacts of the blade 83, and the upper contact of the blade 84 are separated and the lower contact of the blade 84 moves into engagement with the contact of the blade 85, all through the inherent resiliency of the blades.

In Fig. 9 is shown a wiring diagram which clearly illustrates the electrical system. It is to be noted that, in addition to the above described elements, there are also included an operator's selector switch 94 and a continuous operation switch 95, both of which are manually operable. Normally, the operator's selector switch 94 is in the position shown in Fig. 9 which places the system under dial selector control. Leads 100 through 111 electrically connect the several elements. Wiring is omitted in the drawings except in Fig. 9 for purposes of clarity.

*Operation*

In a typical machine 15, the selector dial 38 includes twelve openings 40 through which are visible the numbers 4, 8, 12, etc., through 48, indicating tape increments in inches. In this example, the tape pressure and measuring wheel 23 is four inches in circumference. Manifestly, the dispensing wheel 23 may be of any selected circumference with the numbers on the plate 32 visible through the openings 40 adjusted accordingly. It is to be understood, of course, that the numbers visible through the openings 40 start at one side of the index stop 34, preferably reading counterclockwise, so that dialing may be clockwise toward the index stop 34, although this arrangement is not essential and may be the opposite.

The casing 17 supports a tape roll 91' rearwardly of the selector mechanism 16 in the usual manner of tape dispensing machines. The machine 15 is charged by threading the tape 91 across the feed wheel 22 and across the fixed knife blade 25.

Assuming that a sixteen inch increment of tape is desired measured and dispensed, the finger is inserted through the opening through which the number 16 is visible and the selector dial 38 is rotated clockwise until the finger engages the stop 34. The pawl 44 holds the selector dial 38 in its advanced position. Rotation of the selector dial 38 effects rotation of the shaft 37 and therethrough rotation of the collar 42, which forces the pin 58 downwardly as the depression 59 in the lower face of the collar 42 is moved clockwise. The leaf spring 63 is deflected downwardly, thereby releasing the trigger 67 of and closing the micro-switch 21. It is to be noted that the worm wheel 49 and the worm gear 55 remain stationary during the rotation of the selector dial 38.

Referring to Fig. 9, it is manifest that closing of the micro-switch 21 energizes both the motor 18 and the solenoid 19, it being assumed that the machine 15 is connected to a suitable electrical outlet. Current flows to the motor 18 from line through the lead 100, the lead 101, the selector switch 94, the lead 109, the micro-switch 21, the lead 107, the switch blade 82 and its contact, the two contacts of the blade 83, the blade 84 and its upper contact, the lead 106, the motor 18, the lead 111, the lead 105, and back to the other side of the line. Similarly, current flows through the solenoid 19 by the circuit from line through the lead 100, the lead 101, the selector switch 94, the lead 109, the micro-switch 21, the lead 107, the switch blade 82 and its contact, the switch blade 83 and its upper contact, the lead 103, the solenoid 19, the lead 104, the lead 105, and back to the other side of the line. Hence, the motor 18 drives the feed wheel 22 through its mechanical connection therewith, and the solenoid 19 is effective to rotate the pivot shaft 70 and the pressure link 77 secured thereto to press the measuring wheel 23 into engagement with the tape 91 at the feed wheel 22.

Rotation of the feed wheel 22 both feeds tape between it and the measuring wheel 23 and rotates the measuring wheel 23. Since the worm gear 55 and the measuring wheel 23 are on the same shaft 56, the worm gear 55 is rotated which, in turn, rotates the worm wheel 49 clockwise. It is to be noted that the worm gear 55 and the worm wheel 49 do not move apart sufficiently to disengage in the movement of the pressure and measuring wheel 23 against the feed wheel 22 and the tape.

The motor 18 will continue to drive the feed wheel 22 until the tape pressure and measuring wheel 23 has been rotated through four complete revolutions on the assumed sixteen inch selection. At the moment the measuring wheel 23 completes its fourth revolution, the pin 58 drops into the depression 59 in the lower face of the collar 42 to deenergize both the motor 18 and the solenoid 19 through opening of the micro-switch 21, the leaf spring 63 moving the bumper 66 into engagement with the trigger 67 thereof. The ratio of the worm gear 55 to the worm wheel 49 is such that the worm wheel 49 is moved through an angle equal in number of degrees to that angle between radii extending diametrically through adjacent openings 40 in the selector dial 38 for each revolution of the worm gear 55 so that the pin 58 will always catch up with the depression 59 to accurately terminate the measurement of any selected increment of tape.

Upon deenergization of the solenoid 19, the spring 74 immediately raises the tape pressure and measuring wheel 23 from engagement with the tape 91 and snugly engages the worm gear 55 with the worm wheel 49 which immediately decelerates any coasting effect between the worm gear 55 and the worm wheel 49 to accurately maintain the pin 58 in the depression 59. The coasting effect of the motor 18 furnishes adequate power for moving the movable knife blade 24 across the tape 91 to sever it. However, in order to provide against the contingency of stiff motors or other possibilities for reducing the coasting effect of the motor 18, the conductive blade 85 and its contact are provided which is engaged by the lower contact of the conductive blade 84 as the movable cutting knife 24 begins its cutting action, thereby reenergizing the motor 18, but not the solenoid, for the tape cutting stroke. The circuit is manifest from an inspection of Fig. 9. It is to be understood, as set forth above, that the cutting blade 24 is actuated by mechanism similar to that disclosed in the copending application of applicant. As the cutting blade 24 returns to its raised or inoperative position, the just mentioned circuit through the motor 18 is broken and the motor 18 deenergized. The conductive switch blades 82 through 85 resume the positions shown in Fig. 9.

It is manifest from the foregoing taken with the drawings that any selected increment of tape within the capacity of the particular machine 15 may be quickly and accurately dispensed. It is to be understood, of course, that the dispensed increment of tape is passed over the usual moistened brush to wet the glue, the brush being disposed in the usual reservoir. To change the tape increments, it is but necessary to replace the measuring wheel 23 with another wheel of the desired circumference.

The present machine 15 will accurately dispense tape increments at a relatively high speed, the speed being limited primarily by the rate at which the dispensed tape can be properly moistened. Thirty to forty inches of tape per second may be accurately dispensed by the present machine 15. It is manifest that the instant matively few parts, both mechanical and electrical, chine 15 is rugged in construction and has relaAs is illustrated in Fig. 9, the instant machine 15 may be optionally operated for the continuous measuring and dispensing of tape. When the operator's selector switch 94 is moved from the position shown in Fig. 9 to a position in which the movable contact blade engages the upper shown contact, the electrical system of the dial selector mechanism 16 is rendered ineffective. However, when the switch 95 is closed, the machine 15 will continue to dispense tape until the switch 95 is released. This continuous tape operation is helpful in some packaging operations, and is useful for loading a new roll, removing a fragment, and the like.

It is manifest that there has been provided a simplified mechanical electrical tape measuring and dispensing machine which fulfills the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In a tape measuring and dispensing machine comprising in combination, a support, a tape feed member movably mounted thereon, electrical power means operatively connected to said tape feed member for moving the same, a movable tape measuring and presser member movably mounted on said support, electrical power means operatively connected to said measuring and presser member for moving the same into driven engagement with said tape feed member, and mechanical-electrical mechanism for selecting tape segments to be fed and measured and for energizing and deenergizing said two power means to effect feeding and measuring of the selected tape segment, said mechanism being in mechanical driven connection with said measuring and presser member whereby movement of the latter is effective to control the length of tape dispensed in one cycle of operation of the machine.

2. In a tape measuring and dispensing machine comprising in combination, a support, a tape feed member movably mounted thereon, electrical power means operatively connected to said tape feed member for moving the same, a movable tape measuring and presser member movably mounted on said support, electrical power means operatively connected to said measuring and presser member for moving the same into driven engagement with said tape feed member, and mechanical-electrical mechanism for selecting tape segments to be fed and measured and for energizing and deenergizing said two power means to effect feeding and measuring of the selected tape segment, said mechanism including a manually movable element adapted to effect energization of said two power means and a power actuated movable element adapted to effect deenergization of said two power means, each displacement of said manually movable element relative to said power actuated movable element determining the length of tape segment to be measured and each power actuated movement of the power actuated movable element being such as to equal the displacement of the manually movable element.

3. In a tape measuring and dispensing machine comprising in combination, a support, a tape feed member movably mounted thereon, electrical power means operatively connected to said tape feed member for moving the same, a movable tape measuring and presser member movably mounted on said support, electrical power means operatively connected to said measuring and presser member for moving the same into driven engagement with said tape feed member, and mechanical-electrical mechanism for selecting tape segments to be fed and measured and for energizing and deenergizing said two power means to effect feeding and measuring of the selected tape segment, said mechanism including a switch in circuit with said two power means, a manually movable element having a recess, a movable pin extending into said recess, a power moved element, said pin being supported by said power moved element, said pin being operatively associated with said switch to effect closure of the same upon being forced from said recess upon movement of said leader element and to effect an open condition of the same upon being returned to said recess.

4. A tape measuring and dispensing machine comprising, in combination, a support, a tape feeding wheel rotatably mounted on said support, a tape measuring and presser wheel pivotally and rotatably mounted on said support, a motor mounted on said support mechanically connected to said feeding wheel for rotation thereof, electrically energized power means mechanically connected to said tape measuring and presser wheel for pivotal movement of the latter into engagement with said feeding wheel, and mechanical-electrical mechanism for selecting tape segments to be fed and measured and for energizing and deenergizing said motor and power means to effect feeding and measuring of the selected tape segment including a one-way tape increment selector dial and an annular member secured thereto for rotation therewith, switch mechanism for energizing said motor and power means, means actuatable by rotation of said annular member for closing said switch mechanism and for maintaining it closed, and means for releasing said last-mentioned means effective upon measurement and feeding by said feeding wheel and measuring and presser wheel of the selected tape segment.

5. A tape measuring and dispensing machine comprising, in combination, a support, a tape feeding wheel rotatably mounted thereon, power means for rotating said feeding wheel operatively connected thereto, a rotatably mounted tape measuring and presser wheel on said support, power means for moving said presser wheel into engagement with said feeding wheel operatively connected thereto, and a tape segment selector device on said support including a dial and shaft mounted for rotation as a unit in one direction, and a mechanical device actuatable upon rotation of said dial and shaft to close circuits to energize said two power means to effect rotation of said tape feeding wheel and movement against said feeding wheel of said measuring and presser wheel to rotate the same, said mechanical device including mechanical mechanism actuatable by rotation of said measuring and presser wheel to open circuits to deenergize said two power means as measurement of the selected tape segment is completed.

6. A tape measuring and dispensing machine comprising, in combination, a support, a tape feeding wheel rotatably mounted thereon, a motor on said support, means operatively connecting said motor and feeding wheel for rotation of the latter by the former, a yoke pivotally mounted on said support, a stub shaft rotatably supported by said yoke at its free end, a tape measuring and presser wheel secured to said stub shaft and disposed adjacent said feeding wheel, means biasing said measuring and presser wheel away from said feeding wheel, electrical power means for pivoting said yoke against the force of said biasing means to move said measuring and presser wheel into engagement with said feeding wheel, means operatively connecting said electrical power means with said yoke to pivot the latter by the former, a sleeve mounted on said support, a shaft rotatably mounted in said sleeve, a tape segment selector dial secured to one end of said shaft, said dial and shaft being operatively rotatable in one direction, a toothed collar secured to the other end of said shaft, means engaging said collar teeth for maintaining said dial and shaft in the position to which rotated, a recess in one face of said collar, an axially movable pin having one end in said recess, a worm wheel adjacent said collar freely rotatable on said shaft, said pin extending through and being supported by said worm wheel, a second pin disposed in an axial well in said worm wheel and connected to said first pin for simultaneous axial movement therewith, a switch in circuit with said motor and electrical power means including an actuator arm, said second pin engaging said arm to effect closure of said switch and energize said motor and electrical power means upon axial movement of said first pin, said first pin being moved axially from said recess upon rotation of said dial and shaft in the selecting of a tape segment, and a worm gear secured to said stub shaft supporting said measuring and presser wheel and in mesh with said worm wheel, said worm gear on tape measuring rotation of said measuring and presser wheel being adapted to rotate said worm wheel a predetermined number of degrees in the direction of rotation of said collar to return said first pin to said recess in said collar to effect an open condition of said switch to deenergize said motor and electrical power means.

7. In a tape measuring and dispensing machine, in combination, a support, and tape selector and measuring mechanism including a shaft rotatably mounted on said support, a finger dial secured to one end of said shaft for rotation thereof, a toothed collar secured to said shaft for rotation therewith, means engaging said collar for maintaining said shaft in selected moved position, a worm wheel mounted on said shaft adjacent said toothed collar, said worm wheel being freely rotatable on, but anchored against axial movement along, said shaft, a dwell depression in said collar adjacent said worm wheel, a pin member mounted in said worm wheel for movement therewith and axially thereof having a portion disposed in said depression when said mechanism is at rest and being movable from said depression upon rotation of said collar, means biasing said pin member towards said collar, a worm gear in mesh with said worm wheel, a shaft segment mounted on said support for limited pivotal movement and for rotation, and a tape measuring and presser wheel secured to said shaft segment for rotation therewith, said worm gear being also secured to said shaft segment for rotation therewith.

8. In a tape measuring and dispensing machine, in combination, a support, and tape selector and measuring mechanism including a shaft rotatably mounted on said support, a finger dial secured to one end of said shaft for rotation thereof, a toothed collar secured to said shaft for rotation therewith, means engaging said collar for maintaining said shaft in selected moved position, a worm wheel mounted on said shaft adjacent said toothed collar, said worm wheel being freely rotatable on, but anchored against axial movement along, said shaft, a dwell depression in said collar adjacent said worm wheel, a pin member mounted in said worm wheel for movement therewith and axially thereof having a portion disposed in said depression when said mechanism is at rest and being movable from said depression upon rotation of said collar, means biasing said pin member towards said collar, including a leaf spring, said leaf spring being movable by said pin member upon its movement from said depression, a normally closed switch mounted on said support adjacent said leaf spring including a spring biased make and break trigger engaged by said leaf spring and maintained thereby in depressed open switch position when said pin member is in said depression and in outwardly closed switch position when said pin member is out of said depression, a worm gear in mesh with said worm wheel, a shaft segment mounted on said support for limited pivotal movement and for rotation, and a tape measuring and presser wheel secured to said shaft segment for rotation therewith, said worm gear being also secured to said shaft segment for rotation therewith.

9. In a tape measuring and dispensing machine, in combination, a support, and tape selector and measuring mechanism including a shaft rotatably mounted on said support, a finger dial secured to one end of said shaft for rotation thereof, said finger dial including finger openings spaced equally around the axis of rotation, a toothed collar secured to said shaft for rotation therewith, means engaging said collar for maintaining said shaft in selected moved position, a worm wheel mounted on said shaft adjacent said toothed collar, said worm wheel being freely rotatable on, but anchored against axial movement along, said shaft, a dwell depression in said collar adjacent said worm wheel, a pin member mounted in said worm wheel for movement therewith and axially thereof having a portion disposed in said depression when said mechanism is at rest and being movable from said depression upon rotation of said collar, means biasing said pin member towards said collar, a worm gear in mesh with said worm wheel, a shaft segment mounted on said support for limited pivotal movement and for rotation, and a tape measuring and presser wheel secured to said shaft segment for rotation therewith, the circumference of said tape measuring and presser wheel determining the tape increment per distance between finger openings dispensed by said machine, said worm wheel being also secured to said shaft segment for rotation therewith.

10. In a tape measuring and dispensing machine, in combination, a support, and tape selector and measuring mechanism comprising a shaft rotatably mounted on said support, a finger dial secured to one end of said shaft for rotation thereof, a collar member secured to said shaft for rotation therewith including a depression in one surface, a gear member rotatably mounted adjacent to and on the same axis of rotation with said collar member, a member mounted in said gear member for rotary movement therewith and axial movement relative thereto, said member extending into said depression when said mechanism is in rest position and being forcible axially therefrom upon rotation of said collar member, means biasing said member towards said depression, a tape measuring and presser wheel operatively connected to said gear member for rotation of the latter by the former, switch means adjacent said gear member and member including on and off trigger means, said member biasing means engaging said trigger means and maintaining said trigger in off-switch position when said member is in said depression and permitting said trigger means to move to on-switch position when said member is out of said depression.

11. Tape measuring and dispensing construction as set forth in claim 10 in which said finger dial, said shaft, and said gear member remain at the position to which rotated, and detent means maintaining said finger dial, said shaft, and said gear member in selected moved position.

12. In a tape measuring and dispensing machine, in combination, a support, and tape selector and measuring mechanism mounted on said support including a first rotatably mounted member, means connected to said first member for manual rotation thereof, a second rotatably mounted member adjacent said first member on the same axis therewith, means engaging said first member and said second member for defining a predetermined relationship therebetween, a pivotally and rotatably mounted tape measuring and presser wheel, means mechanically connecting said tape measuring and presser wheel and said second member for rotation of the latter by the former, switch means, and means including said predetermined relationship defining means mechanically interconnecting said first member, said second member, and said switch means for actuation of said switch means upon manual movement of said first member out of said predetermined relationship with said second member.

13. Tape measuring and dispensing construction as set forth in claim 12 in which said means connected to said first member for manual rotation thereof comprises a rotatably mounted shaft to which said first member is secured and a finger dial having spaced finger openings therein secured to said shaft, and detent means for maintaining said dial, shaft, and first member in the position to which they are manually rotated.

14. Tape measuring and dispensing construction as set forth in claim 12 in which said last mentioned interconnecting means includes a depression in said first member, and in which said predetermined relationship defining means includes an axially movable member mounted in said second member for rotary movement therewith and for axial movement in respect thereto, said axially movable member engaging said first member in said depression when said first and second members are in said predetermined relationship, and being forcible from said depression upon manual rotation of said first member, and a leaf spring biasing said axially movable member axially towards said first member and engageable with said switch means for making and breaking the same in the two extreme positions of movement of said leaf spring effected through movement of said axially movable member by said first member.

15. In a tape measuring and dispensing machine, in combination, a support, a tape feed wheel on said support, a motor on said support, gearing connecting said motor and said feed wheel, and a tape selector and measuring mechanism on said support including a rotatably mounted first member, means connected to said first member for manual rotation thereof, a second rotatably mounted member adjacent said first member on the same axis therewith, means engaging said first member and said second member for defining a predetermined relationship therebetween, a pivotally and rotatably mounted tape measuring and presser wheel, means mechanically connecting said tape measuring and presser wheel and said second member for rotation of the latter by the former, switch means, means including said predetermined relationship defining means mechanically interconnecting said first member, said second member, and said switch means for actuation of said switch means upon manual movement of said first member out of said predetermined relationship with said second member, a solenoid on said support, and means connecting said solenoid and said measuring and presser wheel for movement of the latter against said feed wheel upon energization of the former, said switch means being connected in circuit with said motor and said solenoid, closing of said switch means upon manual rotation of said first member out of said predetermined relationship energizing said motor and said solenoid to rotate said measuring and presser wheel a predetermined amount.

HERBERT W. HEMPEL.

References Cited in the file of this patent

UNITED STATES PATENTS

| Number | Name | Date |
|---|---|---|
| 1,732,635 | Chabot | Oct. 22, 1929 |
| 2,115,737 | Menschner | May 3, 1938 |
| 2,258,912 | Steen | Oct. 14, 1941 |
| 2,298,492 | Longfield | Oct. 13, 1942 |
| 2,324,987 | Secrest | July 20, 1943 |
| 2,408,363 | Beckman | Oct. 1, 1946 |